United States Patent
Ralidak

(10) Patent No.: US 9,560,855 B1
(45) Date of Patent: Feb. 7, 2017

(54) BIG GAME FIELD DRESSING DEVICE

(71) Applicant: James Paul Ralidak, Rush City, MN (US)

(72) Inventor: James Paul Ralidak, Rush City, MN (US)

(*) Notice: Subject to any disclaimer, the term of this patent is extended or adjusted under 35 U.S.C. 154(b) by 0 days.

(21) Appl. No.: 15/139,411

(22) Filed: Apr. 27, 2016

(51) Int. Cl.
*A22C 25/06* (2006.01)
*A22B 5/06* (2006.01)
*A22C 17/02* (2006.01)
*A01M 31/00* (2006.01)

(52) U.S. Cl.
CPC ............... *A22B 5/06* (2013.01); *A01M 31/00* (2013.01); *A22C 17/02* (2013.01)

(58) Field of Classification Search
CPC ............ A22C 25/06; A22C 25/16; A22B 5/06
USPC ................................. 452/185, 187–192, 194
See application file for complete search history.

(56) References Cited

U.S. PATENT DOCUMENTS

| | | | | |
|---|---|---|---|---|
| 5,211,601 A | * | 5/1993 | Cope ...................... | A22B 5/161 452/128 |
| 7,059,956 B1 | * | 6/2006 | Summerlin .............. | A22B 5/06 452/192 |
| 7,261,631 B1 | * | 8/2007 | Golson, Sr. .............. | A22B 5/06 452/187 |
| 7,485,032 B1 | * | 2/2009 | Hogue ..................... | A22B 5/06 452/187 |
| 7,806,755 B1 | * | 10/2010 | Martinelli ................ | A22B 5/06 452/185 |
| 8,210,912 B2 | * | 7/2012 | Ugiansky ................. | A22B 5/06 452/187 |
| 8,574,042 B1 | * | 11/2013 | Sloan ...................... | A22B 5/161 452/128 |

* cited by examiner

*Primary Examiner* — Richard Price, Jr.
(74) *Attorney, Agent, or Firm* — Dave Alan Lingbeck

(57) ABSTRACT

A big game field dressing device for expediting the gutting and cleaning of big game. The big game field dressing device includes an elongate base member; support members in communication with the elongate base member; an extension assembly including extension members in communication with the support members; and brace members in communication with the elongate base member.

18 Claims, 3 Drawing Sheets

BIG GAME FIELD DRESSING DEVICE

BACKGROUND OF THE INVENTION

Field of the Invention

The present invention relates to field dressing devices and more particularly pertains to a new big game field dressing device for expediting the gutting and cleaning of big game.

Description of the Prior Art

The use of field dressing devices is known in the prior art. More specifically, field dressing devices heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a device for holding the carcass of an animal in a selected position for removing skin from the carcass of the animal having a horizontal bench like platform supported by multiple legs. The animal which is to be skinned is placed on the horizontal platform with each of the four legs of the animal having attachment means to one each of four arms which are angularly attached to the horizontal bench. The animal's legs are attached to the arms by adjustable chains or the like and the carcass is held securely in position while it is skinned. Another prior art includes a big game field-dressing kit that permits field-dressing a game animal on the ground and transporting the animal includes several pointed stakes that can be driven into the ground near the animal's head and rear legs. Each of the stakes has a flexible tie such as a rope or cable, and each flexible tie has a loop at the end distal from the stake. One or more of the stakes has notches that can receive the flexible tie after it is passed around the animal's neck, so that the stake acts as a handle for dragging the animal along the ground. Also, another prior art includes a game stabilizing device including a base with arms extending laterally from the base. Extending from the arms are elastic cords with connectors. The prior art may further include legs straps that are placed around the legs of the game. The base of the prior art is placed under the back of the game and the connectors are attached to the leg straps. Therefore, the game is stabilized and preventing swaying and the legs of the game are spread out so that a hunter may easily field dress the animal. While these devices fulfill their respective, particular objectives and requirements, the aforementioned patents do not disclose a new big game field dressing device.

SUMMARY OF THE INVENTION

The general purpose of the present invention, which will be described subsequently in greater detail, is to provide a new big game field dressing device which has many of the advantages of the field dressing devices mentioned heretofore and many novel features that result in a new big game field dressing device which is not anticipated, rendered obvious, suggested, or even implied by any of the prior art field dressing devices, either alone or in any combination thereof. The present invention includes an elongate base member; support members in communication with the elongate base member; an extension assembly including extension members in communication with the support members; and brace members in communication with the elongate base member. None of the prior art includes the combination of the elements of the present invention.

There has thus been outlined, rather broadly, the more important features of the big game field dressing device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new big game field dressing device which has many of the advantages of the field dressing devices mentioned heretofore and many novel features that result in a new big game field dressing device which is not anticipated, rendered obvious, suggested, or even implied by any of the prior art field dressing devices, either alone or in any combination thereof.

Still another object of the present invention is to provide a new big game field dressing device for expediting the gutting and cleaning of big game.

Still yet another object of the present invention is to provide a new big game field dressing device that is easy to transport, carry and to set up for use.

Even still another object of the present invention is to provide a new big game field dressing device that is retractable and foldable into a compact unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
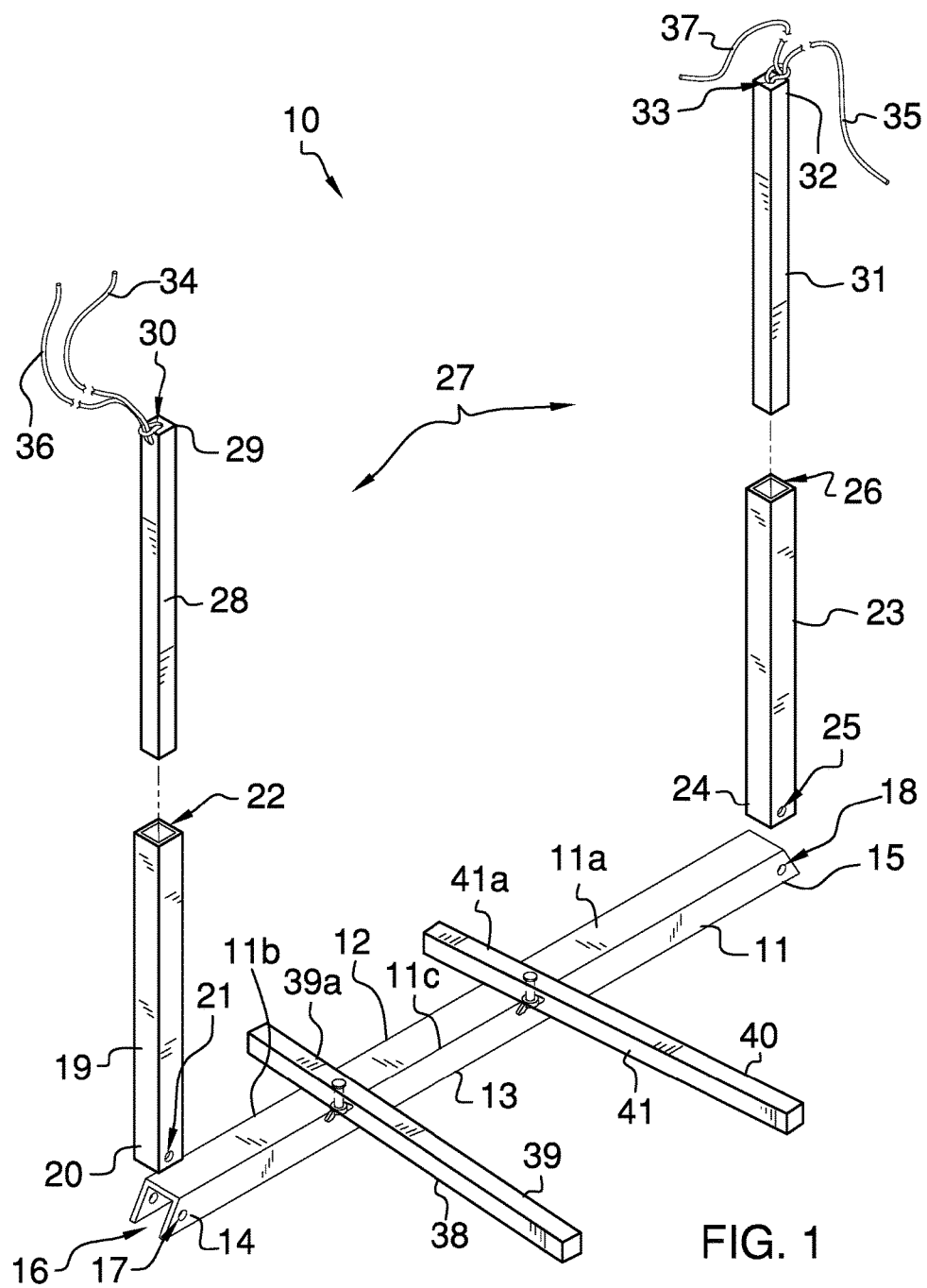
FIG. 1 is an exploded perspective view of a new big game field dressing device according to the present invention.
Figure 2:
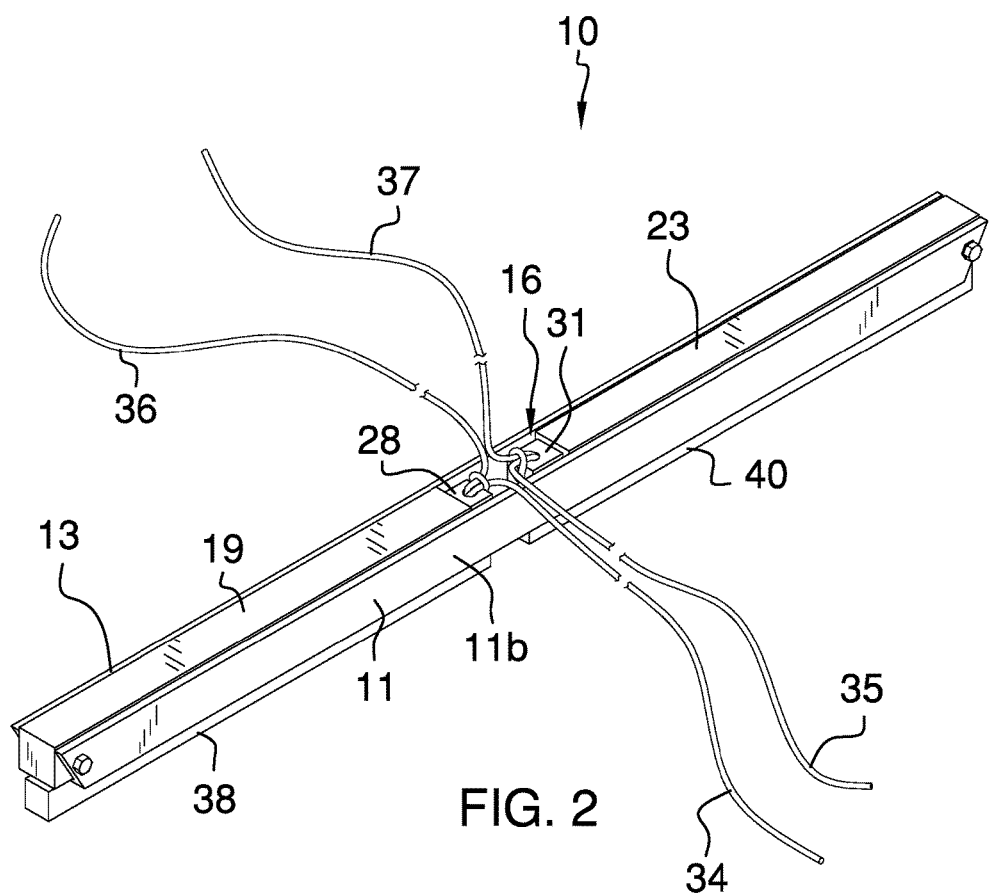
FIG. 2 is a perspective view of the present invention in use.
Figure 3:
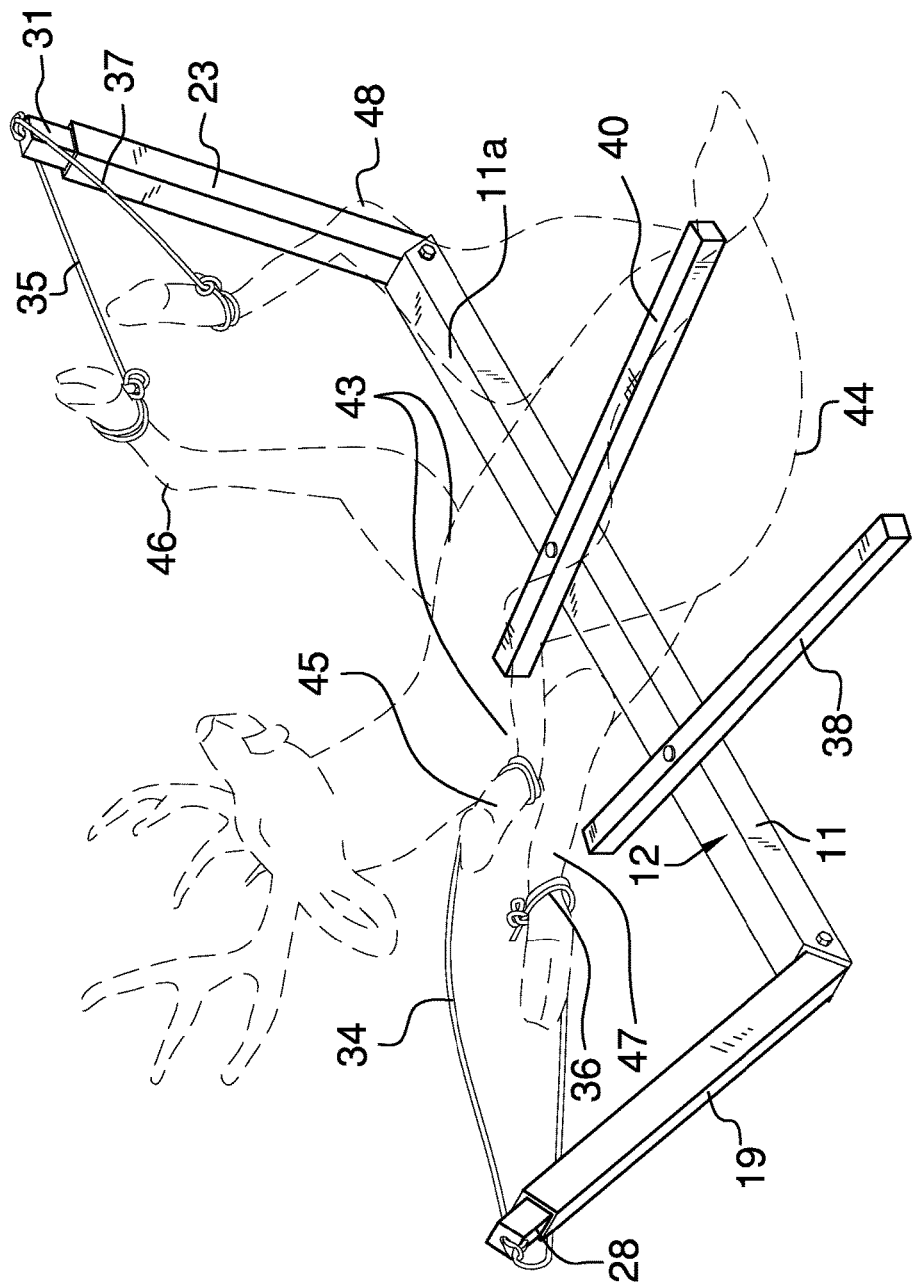
FIG. 3 is another perspective view of the present invention in a storage position.

With reference now to the drawings, and in particular to FIGS. 1 through 3 thereof, a new big game field dressing device embodying the principles and concepts of the present invention and generally designated by the reference numeral 10 will be described.

As best illustrated in FIGS. 1 through 3, the big game field dressing device 10 may generally comprise an elongate base member 11; support members 19, 23 in communication with the elongate base member 11; an extension assembly 27 including extension members 28, 31 in communication with the support members 19, 23; and brace members 38, 40 in communication with the elongate base member 11.

As shown in FIGS. 1 through 3, the elongate base member 11 may have a main wall 11a with a top side 12 and spaced apart side walls 11b, 11e conventionally attached to, depending from and extending a length of the main wall 11a. The elongate base member 11 may also include a bottom 13, opposed ends 14, 15, and a channel 16 disposed in the bottom 12 between the side walls 11b, 11e and extending a length of the elongate base member 11 and through the opposed ends 14, 15. The support members 19, 23 may include first and second support members 19, 23 each being a hollow tubular member having a length and a proximate end 20, 24 hingedly and conventionally attached with a connector at a respective opposed end 14, 15 of the elongate base member 11 with the first and second support members 19, 23 being pivotable relative to the elongate base member 11 and in contactable relationship to the main wall 11a at the opposed ends 14, 15. The elongate base member 11 may have holes 17, 18 disposed therethrough at the opposed ends 14, 15 thereof, and the first and second support members 19, 23 may have holes 21, 25 disposed therethrough at the proximate ends 20, 24 thereof. The first and second support members 19, 23 may be hingedly and conventionally coupled with the connectors to the elongate base member 11 through the holes 17, 18, 21, 25 of the elongate base member 11 and the first and second support members 19, 23. The first and second support members 19, 23 each may have an open distal end 22, 26. The first and second support members 19, 23 may be pivotably and removably received in the channel 16 for storage.

As shown in FIGS. 1 through 3, the extension members 28, 31 may include first and second extension members 28, 31 each having a length and a distal end 29, 32. The extension assembly 27 may also includes flexible lines 34-37 in communication with the distal ends 29, 32 of the first and second extension members 28, 31 for securing legs 45-48 of big game 42 upright relative to the elongate base member 11. The first extension member 28 may be retractably disposed in and extendable from the first support member 19 through the open distal end 22 of the first support member 19. The second extension member 31 may be retractably disposed in and extendable from the second support member 23 through the open distal end 26 of the second support member 23. The flexible lines 34-37 may include front leg flexible lines 34, 35 each of which is removably and conventionally secured at the distal end 29, 32 of a respective first and second extension member 28, 31. The flexible lines 34-37 may also include hind leg flexible lines 36, 37 each of which is removably and conventionally secured at the distal end 29, 32 of a respective said first and second extension member 28, 31. The first and second extension members 28, 31 each may have holes 30, 33 disposed through the distal ends 29, 32 thereof. The flexible lines 34-37 may be removably secured through the holes 30, 33 at the distal ends 29, 32 of the first and second extension members 28, 31.

The brace members 38, 40 each have a length, a main portion 39, 41 and a proximate end portion 39a, 41a which is pivotably and conventionally coupled to the elongate base member 11. The brace members 38, 40 are pivotably coupled to the top side 12 of the elongate base member 11 with conventional connecting members disposed through holes (not shown) through the main wall 11a of the elongate base member 11 and through the proximate end portions 39a, 41a. The proximate end portions 39a, 41a of the brace members 28, 40 are spaced from the opposed ends 14, 15 of the elongate base member 11 and from each other. The brace members 38, 40 are pivotably extendable lengthwise upon the top side 12 of the elongate base member 11 for storage and extendable generally perpendicular to the elongate base member 11 with the main portion 39, 41 and the proximate end portions 39a, 41a extending outwardly in opposite directions from one another relative to the elongate base member 11 to stabilize the elongate base member 11 and the support members 19, 23 upon the ground when in use.

In use, the elongate base member 11 may be stabilized upon a ground with the brace members 38, 40 pivoted at an angle to the elongate base member 11 upon the ground. A big game 42 may then be positioned upon the elongate base member 11 with the shoulders 43 positioned upon the elongate base member 11 and the hind quarter 44 of the big game 42 extended away from the elongate base member 11. The front and hind legs 45-48 of the big game 42 may be secured and spread upwardly from the ground with the support members 19, 23 being pivoted and angled upwardly from the elongate base member 11 away from one another and in contactable relationship to the main wall 11a, and the extension members 28, 31 extended from the support members 19, 23. The front and hind legs 45-48 of the big game 42 may be secured in place using the flexible lines 34-37 and wrapping each of the flexible lines 34-37 about a respective said front and hind legs 45-48.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the big game field dressing device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A big game field dressing device comprising:
    an elongate base member, wherein the elongate base member has a main wall with a top side and side walls attached to the main wall and extending a length of the main wall, wherein the elongate base member also includes opposed ends, a bottom, and a channel disposed in the bottom and extending a length of the elongate base member and through the opposed ends;
    support members in communication with the elongate base member, wherein the support members include first and second support members each being a hollow tubular member having a length and a proximate end hingedly attached at a respective said opposed end of the elongate base member with the respective first and second support members being pivotable relative to the elongate base member and in contactable relationship with the main wall at the opposed ends;

an extension assembly including extension members in communication with the support members; and brace members in communication with the elongate base member.

2. The big game field dressing device as described in claim 1, wherein the elongate base member has holes disposed therethrough at the opposed ends thereof, wherein the first and second support members have holes disposed therethrough at the proximate ends thereof.

3. The big game field dressing device as described in claim 2, wherein the first and second support members are hingedly coupled to the elongate base member at the holes of the elongate base member and the first and second support members.

4. The big game field dressing device as described in claim 1, wherein the first and second support members each have an open distal end, wherein the first and second support members are pivotably and removably received in the channel for storage.

5. The big game field dressing device as described in claim 4, wherein the extension members include first and second extension members each having a length and a distal end, wherein the extension assembly also includes flexible lines in communication with the distal ends of the first and second extension members for securing legs of a big game upright relative to the elongate base member.

6. The big game field dressing device as described in claim 5, wherein the first extension member is retractably disposed in and extendable from the first support member through the open distal end of the first support member.

7. The big game field dressing device as described in claim 6, wherein the second extension member is retractably disposed in and extendable from the second support member through the open distal end of the second support member.

8. The big game field dressing device as described in claim 5, wherein the flexible lines include front leg flexible lines each of which is removably secured at the distal end of a respective said first and second extension members for securing front legs of the big game in an upright position.

9. The big game field dressing device as described in claim 8, wherein the flexible lines also include hind leg flexible lines each of which is removably secured at the distal end of a respective said first and second extension members for securing hind legs of the big game in an upright position.

10. The big game field dressing device as described in claim 5, wherein the first and second extension members each have holes disposed through the distal ends thereof, wherein the flexible lines are removably secured through the holes at the distal ends of the first and second extension members.

11. A big game field dressing device comprising:
an elongate base member, wherein the elongate base member has a main wall with a top side and side walls attached to the main wall and extending a length of the main wall, wherein the elongate base member also includes opposed ends, a bottom, and a channel disposed in the bottom and extending a length of the elongate base member and through the opposed ends;

support members in communication with the elongate base member;

an extension assembly including extension members in communication with the support members; and brace members in communication with the elongate base member, wherein the brace members each have a length, a main portion and a proximate end portion which is pivotably coupled to the elongate base member and spaced from the opposed ends of the elongate base member.

12. The big game field dressing device as described in claim 11, wherein the proximate end portions of the brace members are spaced apart and are pivotably coupled to the bottom side of the elongate base member.

13. The big game field dressing device as described in claim 12, wherein the brace members are pivotably extendable lengthwise upon the bottom side of the elongate base member for storage and extendable generally perpendicular to the elongate base member with the main portion and the proximate end portions extending outwardly in opposite directions from one another relative to the elongate base member to stabilize the elongate base member and the support members upon the ground when in use.

14. A method for using a big game field dressing device comprises the steps of:
providing an elongate base member, support members hingedly coupled to the elongate base member, extension members in communication with the support members, flexible lines in communication with the extension members, and braces pivotably coupled to the elongate base member;

stabilizing the elongate base member upon a ground;

positioning a big game upon the elongate base member; and securing and spreading front and hind legs of the big game upwardly from the ground.

15. The method for using the big game field dressing device as described in claim 14, wherein the stabilizing the elongate base member includes pivoting the brace members at angles relative to the elongate base member upon the ground.

16. The method for using the big game field dressing device as described in claim 14, wherein the positioning the big game includes positioning the shoulders of the big game upon the elongate base member and a hind quarter of the big game extended away from the elongate base member.

17. The method for using the big game field dressing device as described in claim 14, wherein the securing and spreading includes pivoting the support members upwardly from the elongate base member at angles relative to the elongate base member and away from one another and extending the extension members from the support members.

18. The method for using the big game field dressing device as described in claim 17, wherein the securing and spreading includes securing the front and hind legs of the big game using the flexible lines and wrapping each of the flexible lines about a respective said front and hind legs.

* * * * *